United States Patent [19]

Cage et al.

[11] Patent Number: 5,828,984
[45] Date of Patent: Oct. 27, 1998

[54] DATA PROCESSING METHOD FOR AN ELECTRONIC COMPASS SYSTEM

[75] Inventors: Russell E. Cage, Ann Arbor; Rafi A. Al-Attar, Troy, both of Mich.

[73] Assignee: Chrysler Corporation, Auburn Hills, Mich.

[21] Appl. No.: 131,014

[22] Filed: Oct. 1, 1993

Related U.S. Application Data

[63] Continuation of Ser. No. 815,266, Dec. 27, 1991, abandoned.

[51] Int. Cl.$^6$ ........................................................ G01C 17/38
[52] U.S. Cl. ............................ 702/92; 702/93; 701/224; 33/352; 33/356; 33/357; 73/1.76
[58] Field of Search ................................. 364/449, 457, 364/559, 571.02, 571.05; 33/356, 355 R, 357, 361, 352; 324/247, 253, 244; 702/93, 57, 64, 68, 74, 92, 94, 95, 104, 107, 150, 151, 189, 190, 198; 701/224, 200.1; 73/1.75–1.77, 503.3, 504.03, 504.02

[56] References Cited

U.S. PATENT DOCUMENTS

| | | | |
|---|---|---|---|
| 3,899,834 | 8/1975 | Harrison, Jr. | 33/352 |
| 3,991,361 | 11/1976 | Mattern et al. | 324/244 |
| 4,414,753 | 11/1983 | Moulin et al. | 33/357 |
| 4,424,631 | 1/1984 | Franks | 33/361 |
| 4,425,717 | 1/1984 | Marcus | 33/361 |
| 4,505,054 | 3/1985 | Clark et al. | 33/357 |
| 4,546,551 | 10/1985 | Franks | 33/356 |
| 4,622,646 | 11/1986 | Waller et al. | 702/93 |
| 4,660,161 | 4/1987 | Okada | 364/457 |
| 4,672,565 | 6/1987 | Kuno et al. | 33/357 |
| 4,677,381 | 6/1987 | Geerlings | 324/253 |
| 4,698,912 | 10/1987 | Fowler et al. | 33/356 |
| 4,797,841 | 1/1989 | Hatch | 364/559 |
| 4,807,462 | 2/1989 | Al-Attar | 33/356 |
| 4,831,563 | 5/1989 | Ando et al. | 364/571.05 |
| 5,046,031 | 9/1991 | Wanous | 364/571.02 |
| 5,161,311 | 11/1992 | Esmer et al. | 324/247 |

FOREIGN PATENT DOCUMENTS

| | | |
|---|---|---|
| 0120691 | 10/1984 | European Pat. Off. . |
| 60-135814 | 7/1985 | Japan . |
| 2056686 | 3/1981 | United Kingdom . |

*Primary Examiner*—James P. Trammell
*Assistant Examiner*—Hal D. Wachsman
*Attorney, Agent, or Firm*—Mark P. Calcaterra

[57] ABSTRACT

A method for converting distorted compass data values into corrected data values which employs linear transforms. A linear transform is formulated and programmed into the read only memory of the microcomputer of the electronic compass system. The microcomputer uses the linear transform to transform compass data readings distorted by ferrous metals in the environment of the vehicle into corrected data readings and then uses the corrected data readings to compute headings.

5 Claims, 4 Drawing Sheets

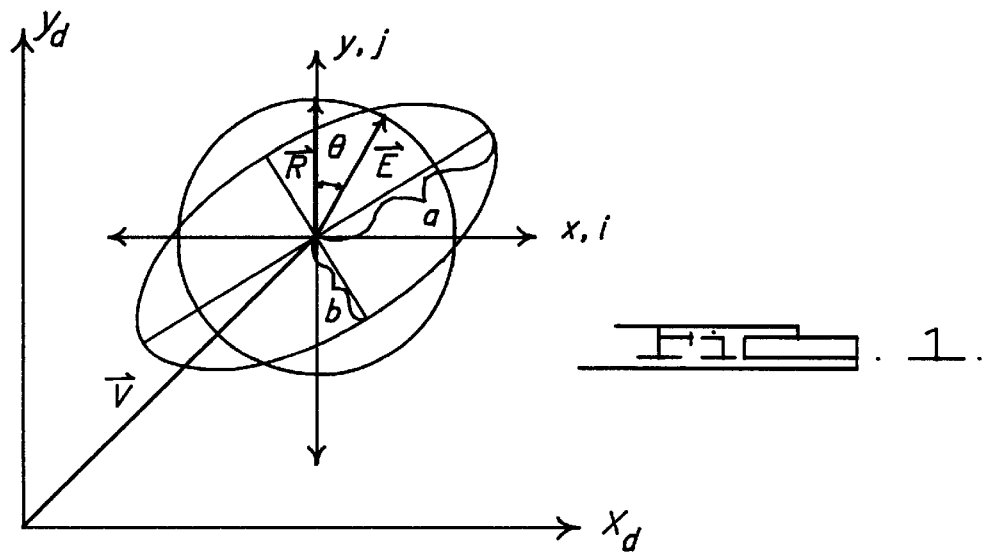
FIG. 1.
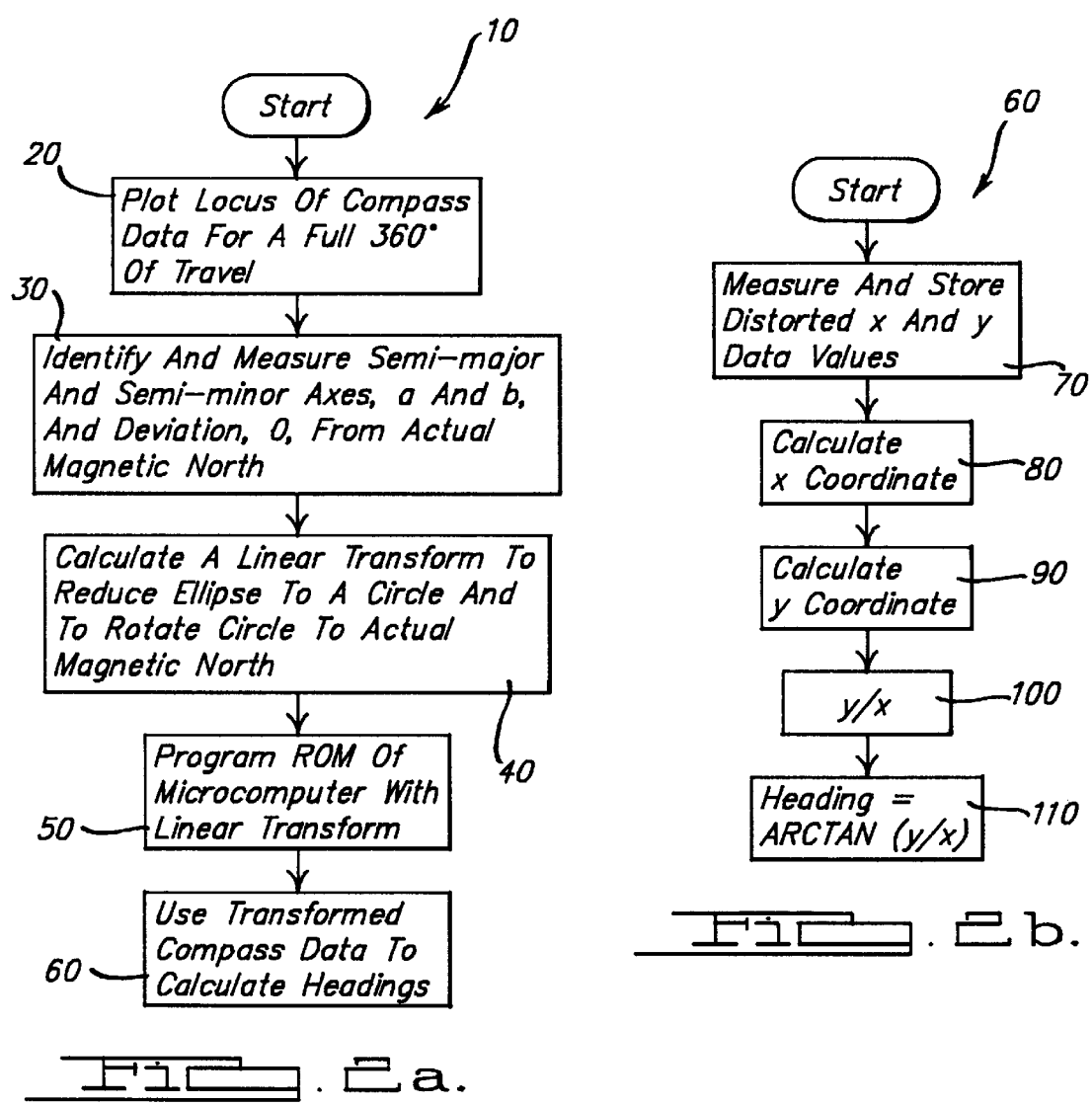
FIG. 2a.
FIG. 2b.

DATA PROCESSING METHOD FOR AN ELECTRONIC COMPASS SYSTEM

CROSS-REFERENCE TO RELATED APPLICATIONS

This is a continuation of U.S. patent application Ser. No. 07/815,266, filed Dec. 27, 1991 now abandoned.

The present application is related to the following, applications filed concurrently herewith:

"Scaling System And Method For An Electronic Compass", application Ser. No. 07/815,347, now U.S. Pat. No. 5,351,204 (Attorney Docket No. 88-899 (S-27);

"Shifting System And Method For An Electronic Compass System", application Ser. No. 07/815,267, now U.S. Pat. No. 5,353,241 (Attorney Docket No. 89-836 (S-27);

"Heading Computation For An Electronic Compass", application Ser. No. 07/815,346, now abandoned (Attorney Docket No. 88-900 (S-27);

"Magnetic Transient Detection And Calibration Technique For An Auto-Calibrating Compass", application Ser. No. 07/815,268, now U.S. Pat. No. 5,297,065 (Attorney Docket No. 88-906 (S-27);

"Method For Selecting Calibration Data For An Auto-Calibrating Compass", application Ser. No. 07/815,264, now U.S. Pat. No. 5,297,063 (Attorney Docket No. 89-835 (S-27);

"Flux-Gate Sensor Orientation Method", application Ser. No. 07/815,265, now U.S. Pat. No. 5,253,424 (Attorney Docket No. 89-863 (S-27);

"Noise Removal Method For An Electronic Compass", application Ser. No. 07/815,269, now U.S. Pat. No. 5,323,336 (Attorney Docket No. 89-874 (S-27);

"Flux-Gate Sensor Mounting And Method", application Ser. No. 07/815,270, now abandoned (Attorney Docket No. 85-849 (S-27);

"A Method For Interpreting Magnetic Direction For A Compass On A Vehicle", application Ser. No. 07/815,274, now U.S. Pat. No. 5,333,110 (Attorney Docket No. 90-824).

The disclosures of all the applications cited above are hereby incorporated by reference and made a part hereof the same as if fully set forth herein.

BACKGROUND OF THE INVENTION

1. Technical Field

The present invention relates to electronic compasses and more specifically a method of processing data in an electronic compass system using linear transforms.

2. Discussion

Normally, electronic compass systems employ a magnetic flux gate sensor. An example of an electronic compass system can be found in U.S. Pat. No. 4,622,843 to Hormel, issued Nov. 18, 1986 entitled "Simplified Calibration Technique and Auto Ranging Circuit for an Electronic Compass Control Circuit". This reference is hereby incorporated by reference.

The operation of the flux gate sensor is well documented. See "Magnetic Field Sensor and Its Application to Automobiles", SAE Paper No. 800123, pages 83–90, February 1980, by Hisatsugu Itoh; and "A Magnetic Heading Reference for the Electro/Fluidic Autopilot", Sport Aviation by Doug Garner, Part I, pages 19–26, November, 1981 and Part II, pages 20–32, 51, December, 1981. These documents are incorporated by reference.

The use of an electronic compass in an environment of ferrous metals causes distortion of the fields sensed by the flux gate sensor. Ferrous metals act as conduits for magnetic fields, focusing them in some places and directions, and rarefying them in others.

Magnetic distortions are of two types, rotations and elliptifications. Rotations are evidenced by an angular deviation between actual magnetic north and the magnetic north sensed by the flux gate sensor. Elliptifications result when magnetic fields are amplified or attenuated along different axes, thereby increasing the field strength sensed by one coil of the flux-gate sensor and decreasing the field strength sensed by the other coil.

A geometric method of calibration can be found in U.S. Pat. No. 4,807,462 issued Feb. 28, 1989 to Rafi A. Al-Attar and entitled "Method for Performing Automatic Calibrations in an Electronic Compass" which is hereby incorporated by reference (hereinafter the '462 patent). This method of calibration relies upon finding the origin of the earth's magnetic field vector from the intersection of the perpendicular bisectors of at least two chord lines of the earth's field circle. Elliptical distortion in incoming data can make this method of calibration inaccurate.

SUMMARY OF THE INVENTION

An object of the present invention is to use linear transforms to offset rotation and elliptification in electronic compass readings and to produce a circle in the transformed coordinates, called the earth's field circle, whose orientation is referenced to actual magnetic north.

Thus, in accordance with the teachings of the present invention, a method for processing data in an electronic compass system using linear transforms is provided. A linear transform for converting distorted compass data values into undistorted data values is formulated. The linear transform is programmed into the read only memory of the microcomputer of the electronic compass system. The microcomputer uses the linear transform to transform distorted compass data readings into corrected data readings and then uses the corrected data readings to compute headings.

BRIEF DESCRIPTION OF THE DRAWINGS

Other objects and advantages of the present invention will become apparent upon reading the following detailed description and upon reference to the following drawings in which:

FIG. 1 contains an ellipse and a circle referenced to a Cartesian coordinate system. The ellipse is generated by a vector $\vec{E}$, which represents the magnitude and direction of the earth's magnetic field as sensed by the flux gate sensor. The circle is generated by a vector $\vec{R}$ which represents the actual magnitude and direction of the earth's magnetic field;

FIGS. 2a and 2b are flowcharts which help illustrate the method of the present invention.

DESCRIPTION OF THE PREFERRED EMBODIMENT

Turning first to FIG. 1, there is shown a Cartesian coordinate system referenced to a frame of reference of a vehicle in which an electronic compass system is installed. The vector $\vec{V}$ is the vehicle's magnetic field vector. This vector remains constant in magnitude and direction. The earth's magnetic field circle 6 is the locus of points described by the earth's magnetic field vector $\vec{R}$ as the vehicle changes heading. Also shown is an ellipse 8 representing a distorted earth's field circle 6. Distortion is produced by ferrous metals within the vehicle. A non-distorted representation of the earth's magnetic field circle 6 is shown in FIG. 1a.

The two forms of distortion, rotation and elliptification, are illustrated in FIG. 1. Rotation is also shown in FIG. 1b. Rotation is the angular deviation between the actual direction of the earth's magnetic field and the direction of the earth's magnetic field as sensed by the flux gate sensor. This angular deviation is represented by the angle θ. Rotation occurs when the earth's magnetic field lines change direction in order to flow through the vehicle. The ferrous metals within the vehicle present a low-resistance path to magnetic field lines when the vehicle is not saturated.

Figure 1A:
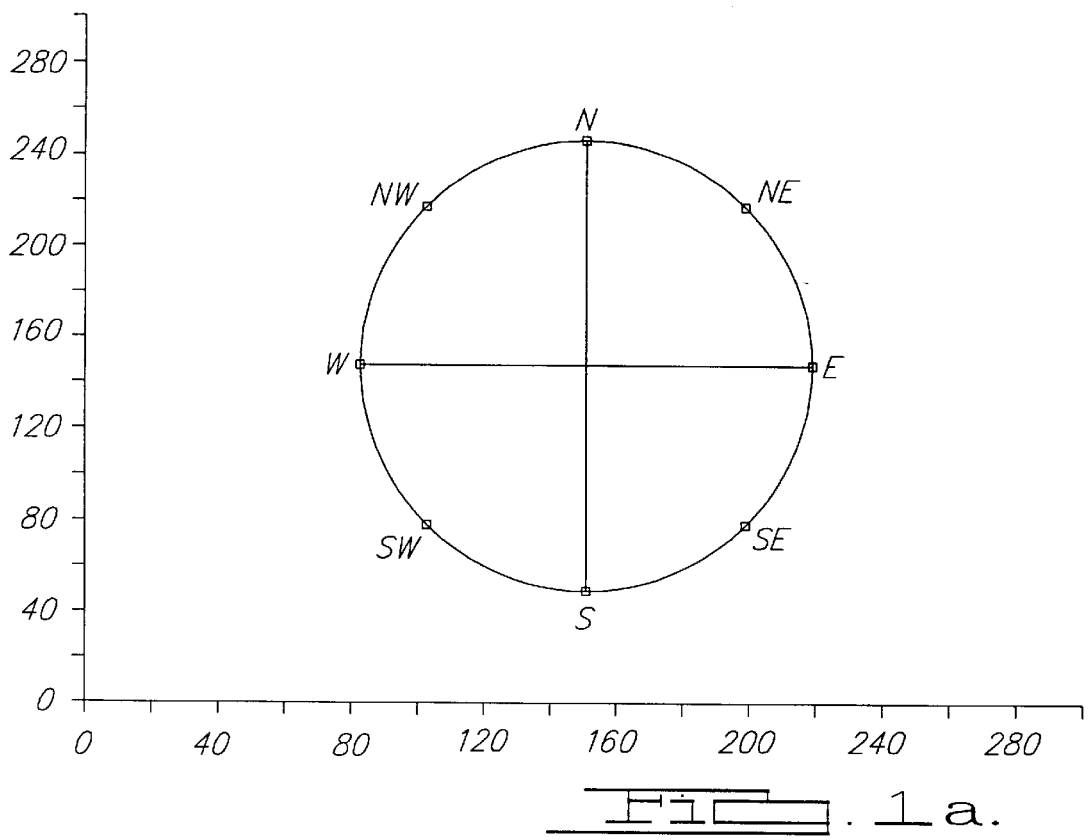
FIG. 1a illustrates a normal circle.
Figure 1B:
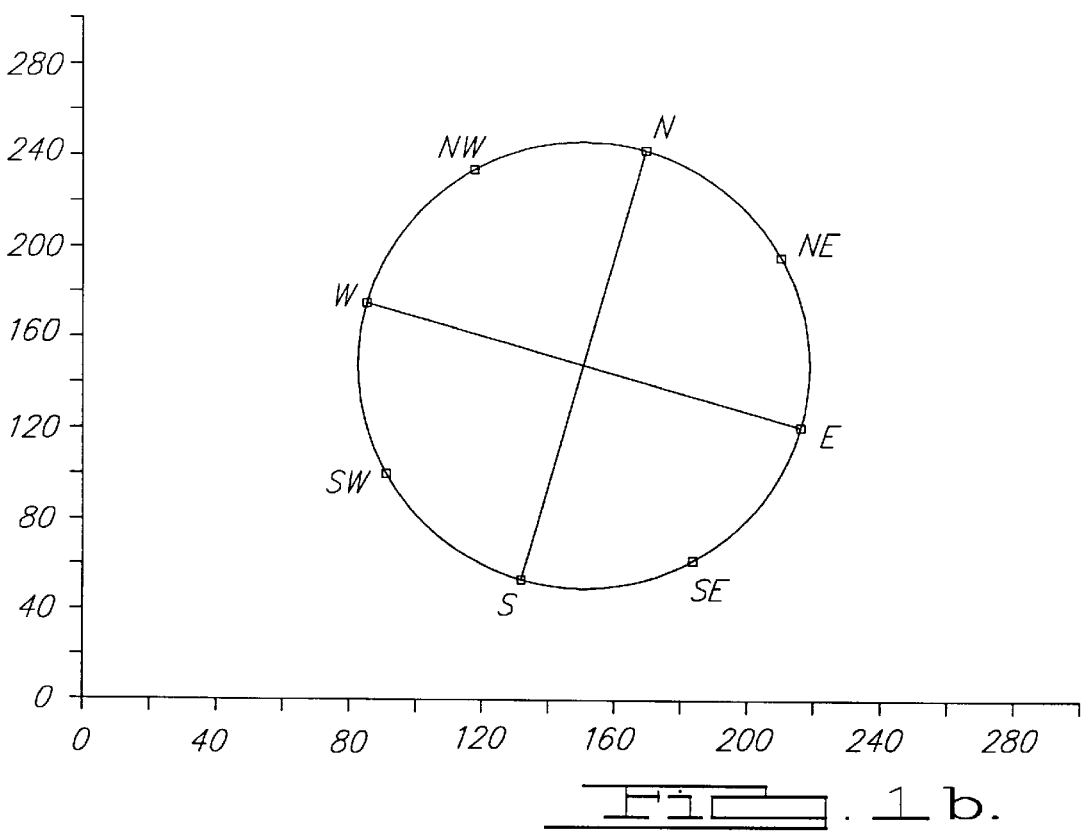
FIG. 1b illustrates an example of rotational distortion.
Figure 1C:
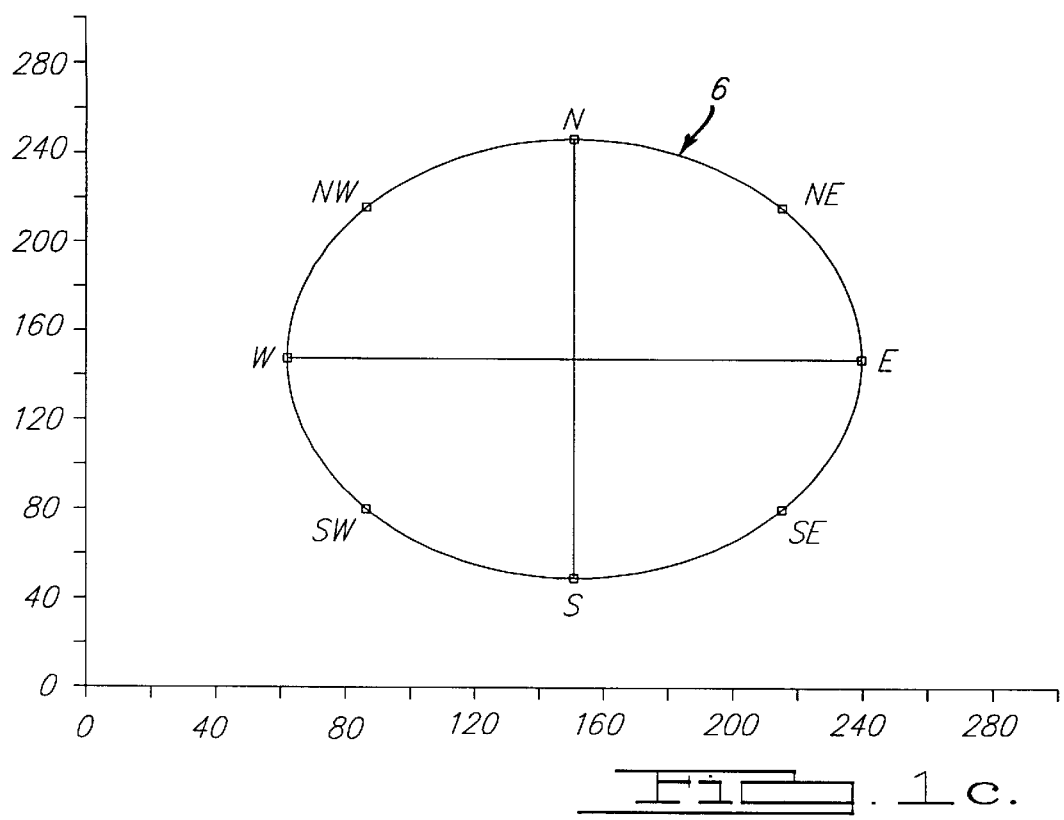
FIG. 1c and 1d illustrate examples of elliptification distortion.
Figure 1D:
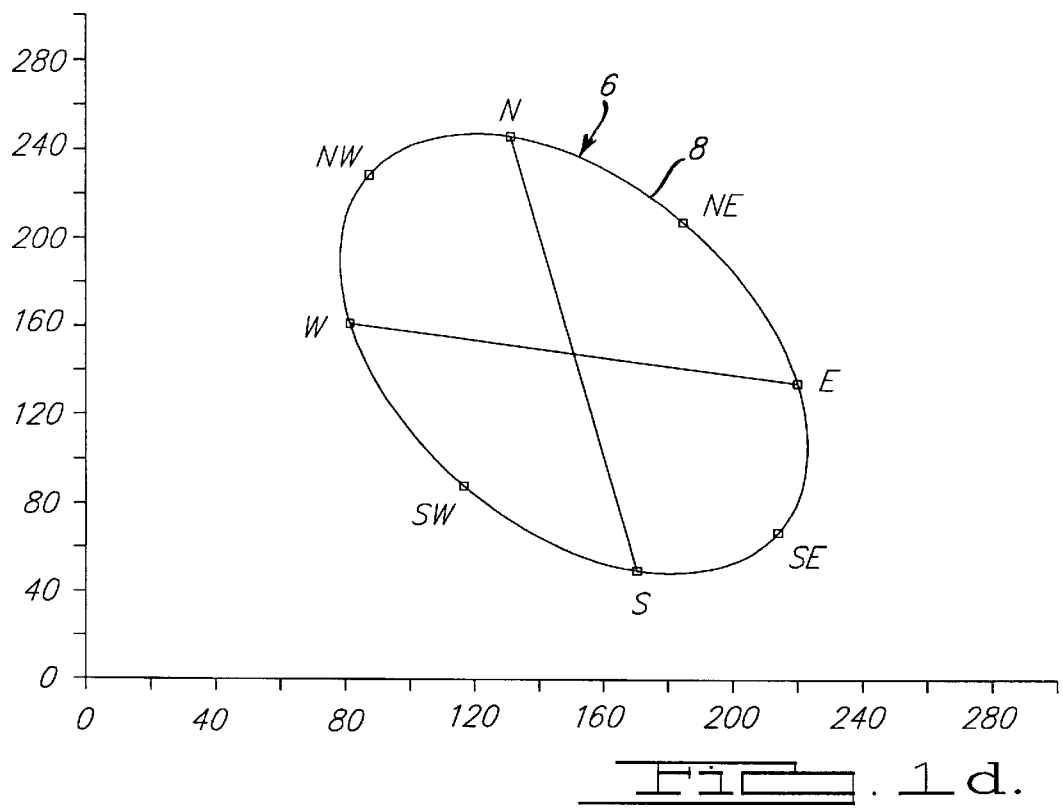

Elliptification is the deviation in magnitude between the actual strength of the earth's magnetic field and the strength of the earth's magnetic field as sensed by the flux gate sensor. Elliptification is illustrated by the vector $\vec{E}$. Elliptification is also shown in FIGS. 1c and 1d. When the magnitude of the vector $\vec{E}$ is greater than the magnitude of vector $\vec{R}$, the earth's magnetic field is being amplified by the vehicle. On the other hand, when the magnitude of vector $\vec{E}$ is less than the magnitude of the vector $\vec{R}$, then the earth's magnetic field is being attenuated by the vehicle. Amplification and attenuation depend upon the orientation of the earth's magnetic field with respect to the vehicle.

The present invention employs linear transforms to offset the effects of rotation and elliptification upon the heading solution generated by a microcomputer of an electronic compass system. Linear transforms are appropriate because the earth's magnetic field is incapable of saturating the flux path through the vehicle. After a linear transform has been used to convert an ellipse into the earth's field circle, the center of the circle can be calculated in the transformed coordinates in a consistent and reliable manner, such as the method disclosed in the '462 patent to Al-Attar.

The earth's magnetic field is distorted by the vehicle by the time it reaches the flux gate sensor. If the corrected field has two components, $\vec{X}$ and $\vec{Y}$, referenced to the x–y coordinate system, then the distorted field has the components $\vec{F}(\vec{X})$ and $\vec{F}(\vec{Y})$ where vector $\vec{F}$ is a distortion operator. Since the metal of the vehicle is not saturated by the earth's magnetic field, the distortion effects are linear. Therefore, $$\vec{F}(\vec{X}+\vec{Y}) = \vec{F}(\vec{X}) + \vec{F}(\vec{Y}) \quad (1).$$

Since $\vec{F}$ is linear and not degenerate, it is possible to derive an operator $\vec{G}$ which is the inverse of $\vec{F}$, such that $$\vec{G}(\vec{F}(\vec{X})) = \vec{X} \quad (2),$$

$$\vec{G}(\vec{F}(\vec{Y})) = \vec{Y} \quad (3).$$

$\vec{G}$ is the operator which will convert the distorted readings sensed by the flux gate sensor into a properly oriented circle.

Solving for $\vec{X}$ and $\vec{Y}$ merely requires solving two simultaneous equations having two unknowns. If the distorted Cartesian coordinate system is referenced to the i and j axes, then $\vec{F}(\vec{X}+\vec{Y})$ has two components in each direction:

$$\vec{F}_i(\vec{X}+\vec{Y}) = \vec{F}_i(\vec{X}) + \vec{F}_i(\vec{Y}) \quad (4),$$

$$\vec{F}_j(\vec{X}+\vec{Y}) = \vec{F}_j(\vec{X}) + \vec{F}_j(\vec{Y}) \quad (5).$$

Since the effects of distortion are linear, $$\vec{F}_i(\vec{X}+\vec{Y}) = f_i(\vec{X}+\vec{Y})\hat{\imath} = ax\hat{\imath} + by\hat{\imath} \quad (6),$$

$$\vec{F}_j(\vec{X}+\vec{Y}) = f_j(\vec{X}+\vec{Y})\hat{\jmath} = cx\hat{\jmath} + dy\hat{\jmath} \quad (7).$$

where x, y, $f_i(\vec{X}+\vec{Y})$, $f_j(\vec{X}+\vec{Y})$ equal the magnitudes of $\vec{X}$, $\vec{Y}$, $\vec{F}_i(\vec{X}+\vec{Y})$, and $\vec{F}_j(\vec{X}+\vec{Y})$, respectively, and $\hat{\imath}$ and $\hat{\jmath}$ are unit vectors. Therefore, once a, b, c and d are determined, x and y can be determined by only four multiplications and two additions using the following equations:

$$x = \frac{d}{ad-bc} f_i(\vec{X}+\vec{Y}) - \frac{b}{ad-bc} f_j(\vec{X}+\vec{Y}) \quad (8)$$

$$y = \frac{a}{ad-bc} f_j(\vec{X}+\vec{Y}) - \frac{c}{ad-bc} f_i(\vec{X}+\vec{Y}) \quad (9)$$

The microcomputer then uses the x and y data values to determine headings.

Theoretically, solving for a, b, c and d requires at least two distorted data points, having coordinates $f_i(\vec{X}+\vec{Y})$ and $f_j(\vec{X}+\vec{Y})$, and their corresponding transformed data values x and y. In practice, however, solving these equations requires at least 3 data points, because the center of the circle must be known before the offsets from the center can be calculated along both axes. The center cannot be calculated without at least 2 data points along one axis, and it is best to get two pairs for cross-checking the data for consistency. It is recommended that 8 data points be used so that two sets of transforms can be calculated and checked against each other to give a rough idea of the reliability of the results. Using two points yields four equations and four unknowns:

$$f_i(\vec{X}+\vec{Y})_1 = ax_1 + by_1 \quad (10),$$

$$f_j(\vec{X}+\vec{Y})_1 = cx_1 + dy_1 \quad (11),$$

$$f_i(\vec{X}+\vec{Y})_2 = ax_2 + by_2 \quad (12),$$

$$f_j(\vec{X}+\vec{Y})_2 = cx_2 + dy_2 \quad (13).$$

Two convenient data points are north and east, represented on the ellipse as N' and E' and on the earth's field circle as N and E. The resulting equations for a, b, c and d are as follows:

$$a = f_i(\vec{X}+\vec{Y})E'/r \quad (14),$$

$$b = f_i(\vec{X}+\vec{Y})N'/r \quad (15),$$

$$c = f_j(\vec{X}+\vec{Y})E'/r \quad (16),$$

$$d = f_j(\vec{X}+\vec{Y})N'/r \quad (17).$$

where r is the radius of the earth's field circle. A value for r can be obtained by approximation and averaging over previously obtained values. One way to estimate r is to average the semi-major and semi-minor axes, A and B, of the ellipse in accordance with the formula:

$$r = 0.5\ (A+B) \tag{18}$$

The radius of the circle output from the transform is somewhat arbitrary; the constants in the transform can be multiplied by most any value and the output will still be a circle. In practice, the multiplier is chosen to make the calculations simpler without adverse effects on the calibration procedure (which is sensitive to the circle radius).

The digital data values making up the ellipse must be converted to values in the i–j coordinate system. This translation of data values from one coordinate system to another is achieved by moving the center of the ellipse ($X_{de}$, $Y_{de}$), which forms the origin $0$ of the i–j coordinate system, to the origin $0_d$ of the digital or $x_d$–$y_d$ coordinate system. Thus, the translation formulas become:

$$f_i\ (\vec{X}+\vec{Y}) = x_d - x_{de} \tag{19}$$

$$f_j\ (\vec{X}+\vec{Y}) = y_d - y_{de} \tag{20}$$

The i–j coordinate system could have been oriented such that the j axis would be aligned with the vector $\vec{E}$; however, this orientation would have required both a rotation and a translation to convert the values of the $x_d$–$y_d$ coordinate system to values in the i–j coordinate system.

The final equations for x and y, after all coefficients and constants have been calculated by hand, are programmed into the microcomputer's ROM.

FIGS. 2(a) and 2(b) summarize the method 10 above. In block 20, compass data is collected for a full 360° and plotted. This data is referenced to the $x_d$–$y_d$ coordinate system. Next, in block 30, measurements of the semi-major and semi-minor axes, a and b shown in FIG. 1, and the data points ($x_{cd'N}$, $y_{dN}$), ($x_{dE'}$, $y_{dE}$), and ($x_{de}$, $y_{de}$) are obtained. In block 40, these measurements are used to formulate a linear transform, which in block 50 is programmed into the ROM of the microcomputer. In block 60, the microcomputer transforms the distorted data values in the $x_d$–$y_d$ coordinate system to values in the x–y coordinate system before computing vehicle headings.

The method of block 60 is shown in more detail in FIG. 2(b). The microcomputer measures and stores distorted data values in block 70. In block 80, the microcomputer calculates the x coordinate which represents an undistorted and calibrated value. The microcomputer performs a similar transformation in the distorted y coordinate in block 90. Heading calculations are performed in blocks 100 and 110 by dividing the calibrated and undistorted y value by the calibrated and undistorted x value and the arctangent of the quotient is taken using work-up-tables or a piece-wise-linear-function-of-x routine.

Figure 3:
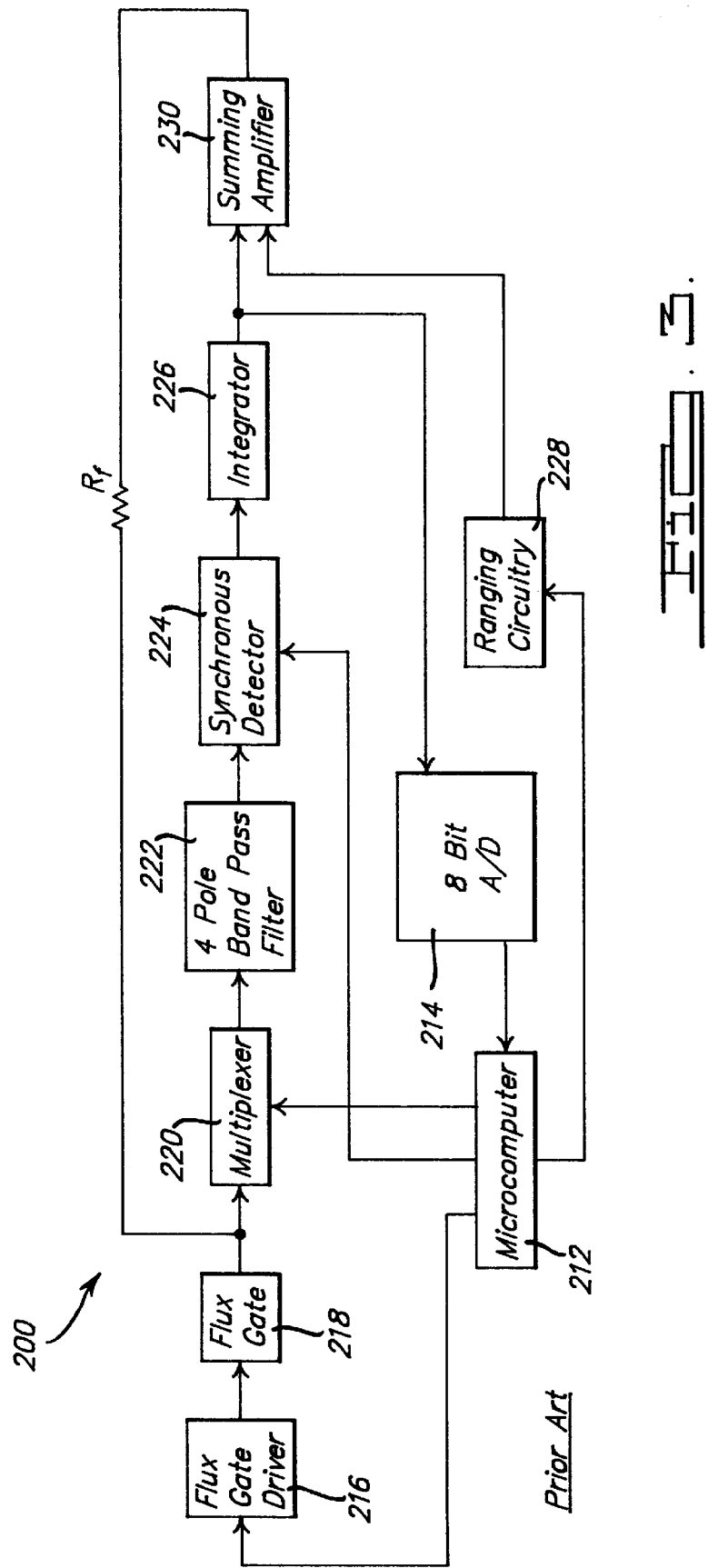
FIG. 3 is a block diagram of the electronic compass system of the '843 patent to Hormel.

Turning now to FIG. 3, there is shown a block diagram of an electronic compass system 200 capable of using the method of the present invention, the '843 patent to Hormel. The heart of the system is the microcomputer 212 which employs an 8-bit analog-to-digital converter 214. The microcomputer 212 controls operation of the electronic compass system 210, beginning with a flux-gate driver 216. Upon receipt of a square-wave signal from the microcomputer 212, the flux-gate driver 216 adds enough drive to the signal to saturate the flux-gate 218. The operation of the flux-gate driver 216 and flux-gate 218 are explained in the documents incorporated by reference, namely "A Magnetic Heading Reference for the Electro/Fluidic Autopilot" and "Magnetic Field Sensor and its Application to Automobiles, (SAE Paper No. 800123)". The flux-gate employs two sense coils oriented perpendicularly to one another. Voltages are induced across the sensor coils by the presence of the magnetic fields of the vehicle and the earth.

The voltages from the sense coils of the flux-gate 218 are processed by the multiplexer 220. The multiplexer 220 is in communication with the microcomputer 212, which generates a signal for controlling a network for switching use of the four-pole bandpass filter 222, the synchronous detector 224 and the integrator 226 periodically from one sense coil to the other. The multiplexer 220 is in communication with the four-pole bandpass filter 222, which filters out all but the second harmonic signals, whose amplitude is proportional to the earth's magnetic field.

Second harmonic signals are presented to the synchronous detector 224. The function of the synchronous detector 224 is to select the portion of the filtered signals to be integrated by the integrator 226. The output of the synchronous detector 224 is a half-wave rectified signal which is fed into the integrator 226.

The output of the integrator 226 periodically switches back and forth between two DC levels corresponding to the two sense coils of the flux-gate 218. Integrator output is stabilized by feeding back a current through resistor $R_f$ to the sense coils of the flux-gate 218. The feedback current eventually becomes an equal and opposite signal versus that produced by the magnetic field sensed by the flux-gate 218. Heading information is determined from the output of the integrator 226. The microcomputer 212 is coupled to the integrator output through the 8-bit analog-to-digital converter 214. The 8-bit analog-to-digital converter 214 converts the DC levels to digital coordinates referenced to a Cartesian coordinate system. The microcomputer 212 divides the y-coordinate, corresponding to the DC level from one coil, by the x-coordinate, corresponding to the other coil, and takes the arctangent of the quotient using a piece-wise-linear-function-of-x routine to yield the vehicle's heading.

Armed with the foregoing detailed description of the sequence of operations carried out by the preferred embodiment of the present invention, those of ordinary skill in the art will readily be able to write their own suitable software to operate a microcomputer-based electronic compass system in accordance with the teachings herein. Accordingly, the details of such software need not be described here. The software may be written in any suitable language, such as a lower-level language like assembly language, or a higher-level language such as "C". Similarly, virtually all of the digital aspects of the control circuitry for an electronic compass system of the present invention may be implemented with any suitable general-purpose microcomputer with off-chip or on-chip A/D capability, or may be implemented in an application-specific integrated circuit custom-designed for handling the required processing activities. Armed with the teachings of the present invention disclosed herein, those of the ordinary skill in the art are well-equipped to implement the present invention in any suitable combination of the digital and/or analog circuits. Accordingly, further details of such hardware need not be described here.

What is claimed is:

1. A method of offsetting elliptification and rotation distortion caused by induced magnetism to obtain undistorted heading data values for determining accurate compass headings in an electronic compass used for a vehicle configuration, comprising:

orienting first and second sense coils of a flux-gate sensor perpendicular to each other in the earth's magnetic field;

saturating said first and second sense coils using a drive signal;

measuring an induced voltage in said first and second sense coils induced by said magnetic field;

calibrating said electronic compass for said vehicle configuration for induced magnetism causing said ellipification and rotation distortion by generating first, second, third and fourth linear transform coefficients;

storing said first, second, third and fourth linear transform coefficients in memory;

obtaining first and second distorted heading data values related to said induced voltage in said first and second sense coils;

multiplying said first linear transform coefficient by said first distorted heading data value to obtain a first product using a processor;

multiplying said second linear transform coefficient by said second distorted heading data value to obtain a second product using said processor;

subtracting said second product from said first product to obtain a first transformed heading data point using said processor;

multiplying said third linear transform coefficient by said first distorted heading data value to obtain a third product using said processor;

multiplying said fourth linear transform coefficient by said second distorted heading data point to obtain a fourth product using said processor;

subtracting said fourth product from said third product to obtain said second transformed heading data point using said processor; and generating a compass heading from said first and second transformed heading data points using said processor.

2. The method of claim 1 wherein said calibrating step includes the steps of:

measuring first and second distorted calibration heading data points related to said induced voltage;

determining first and second transformed calibration heading data points corresponding to said first and second distorted calibration heading data points; and calculating said first, second, third and fourth linear transform coefficients corresponding to said first and second distorted calibration heading data points and said first and second transformed calibration heading data points.

3. The method of claim 2 wherein said step of calculating includes the steps of:

measuring a third distorted calibration heading data point related to said induced voltage;

determining a third transformed calibration heading data point corresponding to said third distorted calibration heading data point;

identifying and measuring semi-major and semi-minor axes of a distorted ellipse; and identifying and measuring angular deviation from true magnetic north.

4. The method of claim 3 wherein said first, second, third and fourth linear transform coefficients reduce said distorted ellipse to a circle and rotate said circle to coincide with true magnetic north.

5. The method of claim 1 wherein said step of generating a compass heading from said first and second transformed heading data points using said processor includes taking an arctangent of said second transformed heading data point divided by said first transformed heading data point.

* * * * *